Sept. 14, 1965                    E. B. LINDSEY                         3,206,138
                  THREAD TENSIONING DEVICE WITH INTERCHANGEABLE PARTS
Filed May 24, 1963                                              4 Sheets-Sheet 1

Elbert B. Lindsey
INVENTOR.

BY Clarence A. O'Brien
and Harvey B. Jacobson
Attorneys

Sept. 14, 1965  E. B. LINDSEY  3,206,138
THREAD TENSIONING DEVICE WITH INTERCHANGEABLE PARTS
Filed May 24, 1963  4 Sheets-Sheet 2

Elbert B. Lindsey
INVENTOR.

BY Clarence A. O'Brien
and Harvey B. Jacobson
Attorneys

Sept. 14, 1965    E. B. LINDSEY    3,206,138
THREAD TENSIONING DEVICE WITH INTERCHANGEABLE PARTS
Filed May 24, 1963    4 Sheets-Sheet 3
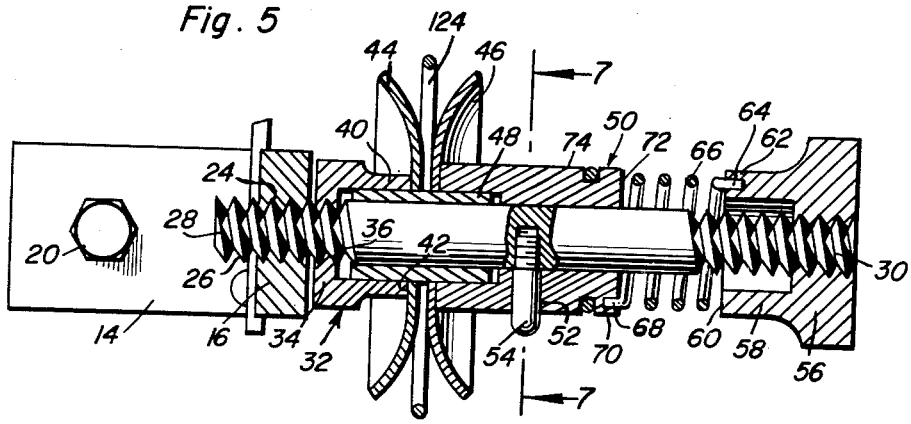
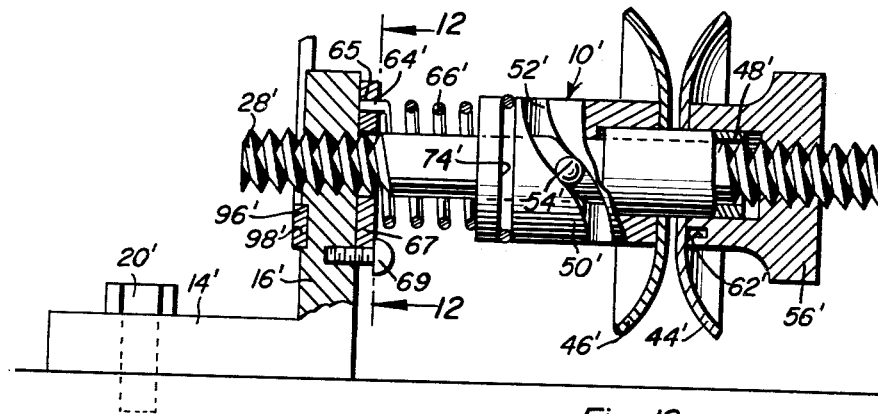
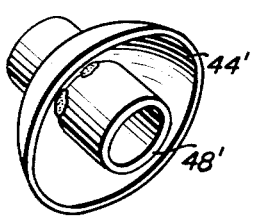
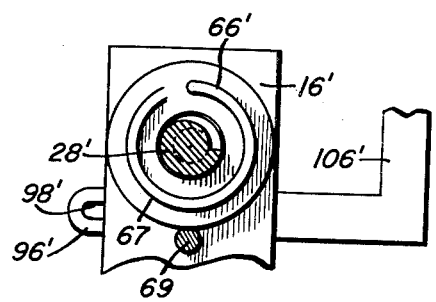
Elbert B. Lindsey
INVENTOR.

Sept. 14, 1965    E. B. LINDSEY    3,206,138
THREAD TENSIONING DEVICE WITH INTERCHANGEABLE PARTS
Filed May 24, 1963    4 Sheets-Sheet 4

Elbert B. Lindsey
INVENTOR.

BY Clarence A. O'Brien
and Harvey B. Jackson
Attorneys

United States Patent Office 3,206,138
Patented Sept. 14, 1965

1

3,206,138
THREAD TENSIONING DEVICE WITH INTERCHANGEABLE PARTS
Elbert B. Lindsey, Fort Payne, Ala., assignor of thirty-three and one-third percent each to Loma B. Beaty and J. L. Hughes, both of Fort Payne, Ala.
Filed May 24, 1963, Ser. No. 283,040
9 Claims. (Cl. 242—150)

This invention relates to a novel and useful thread tensioning device constructed in a manner whereby several of the component parts thereof may be interchanged in position relative to each other so as to adapt the thread tensioning device for mounting on different types of machines such as household sewing machines and substantially all types of knitting machines. The thread tensioning device of the instant invention comprises a modification of the thread tensioning device disclosed in my copending application U.S. Serial No. 193,814, now Patent No. 3,146,969, filed May 10, 1962.

The thread tensioning device includes a pair of side-by-side pressure disks slidably mounted on a support shaft and the pressure disks are adapted to receive therebetween the strand of yarn whose tension is to be adjusted. Abutment means is provided and stationarily supported relative to the shaft and comprises a limit stop for movement of one of the pressure disks away from the other. The tensioning device includes guide or tension arms which are supported by a sleeve rotatably disposed on the support shaft and including cam means engageable with the shaft in a manner so as to effect axial shifting of the sleeve along the shaft in response to rotation of the sleeve relative to the shaft. The sleeve is disposed on the side of the pressure disks remote from the limit means and means is provided for yieldingly urging axial movement of the sleeve toward the pressure disks and rotation of the sleeve in a direction effecting axial shifting of the sleeve toward the disks so as to frictionally grip a length of yarn disposed between the disks.

This yieldable means for effecting both axial and torsional forces upon the sleeve includes means by which the axial thrust effected thereby may be adjusted independently of the torque effected thereby. In addition, the yieldable and adjustable means includes means by which the torque effected thereby may be adjusted independently of the axial thrust effected thereby. In this manner, since both the axial and torsional forces effected by the adjustable and yieldable means acting upon the sleeve control the total force applied to urge the pressure disks together, the thread tensioning device of the instant invention may be finely adjusted so as to effect the optimum amount of tension on the thread associated therewith.

The main object of this invention is to provide a thread tensioning device constructed in a manner whereby some of the component parts thereof may be shifted in position relative to each other so as to adapt the thread tensioning device for securement to various types of knitting and sewing machines.

Another object of this invention, in accordance with the immediately preceding object, is to provide a thread tensioning device having component parts that may be shifted in position relative to each other without ad-

2 versely affecting the basic method of operation of the tensioning device.

Still another object of this invention is to provide an adjustable thread tensioning device in accordance with the preceding objects including means by which the thread being tensioned thereby may be engaged by the tensioning device for operation of the latter without creating excessive drag on the yarn independently of the tension adjustment feature of the device.

A final object of this invention to be specifically enumerated herein is to provide an adjustable thread tensioning device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an enlarged horizontal sectional view taken substantially upon the plane indicated by the section line 5—5 of FIGURE 2;

FIGURE 10 is a side elevational view of a second form of thread tensioning device constructed in accordance with the instant invention with parts thereof being broken away and shown in section;

FIGURE 11 is a perspective view of one of the pressure disks of the thread tensioning device illustrated in FIGURE 10;

FIGURE 12 is a fragmentary transverse vertical sectional view taken substantially upon the plane indicated by the section line 12—12 of FIGURE 10;

Figure 1:
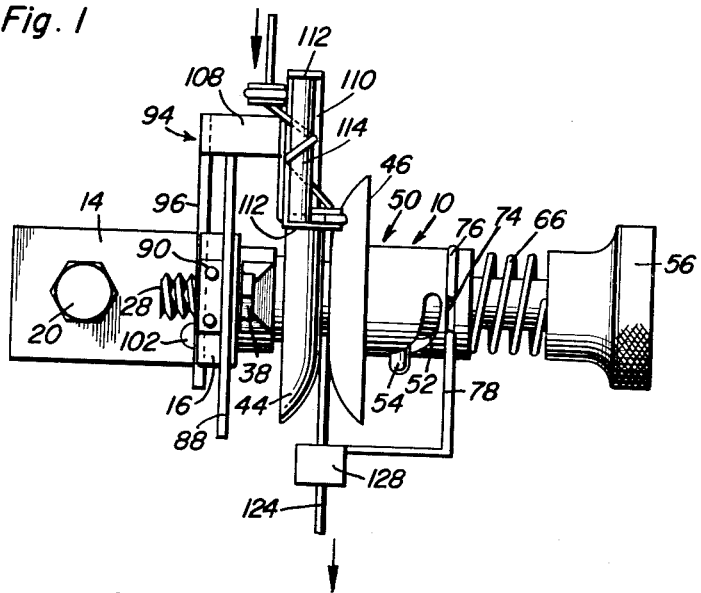
FIGURE 1 is a top plan view of one form of the thread tensioning device of the instant invention.
Figure 2:
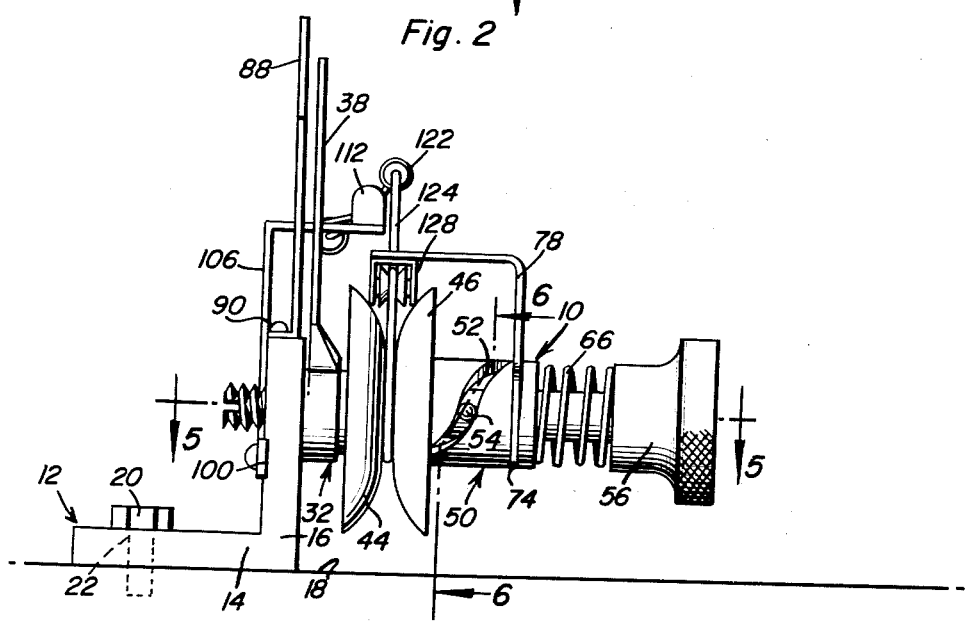
FIGURE 2 is a side elevational view of the embodiment illustrated in FIGURE 1.

Referring now more specifically to the drawings the numeral 10 generally designates a first form of thread tensioning device which is illustrated in FIGURES 1-9. As can best be seen from FIGURES 2-5, 8 and 9, the thread tensioning device 10 includes a support bracket generally referred to by the reference numeral 12 which includes a first leg 14 and a second leg 16. The legs 14 and 16 are disposed at substantially right angles relative to each other and the leg 14 may be removably secured to any suitable mounting surface 18 of a knitting machine by means of a fastener 20 secured through an aperture 22 formed in the first leg 14.

The second leg 16 has a threaded bore 24 formed therethrough in which one externally threaded end portion 26 of a support shaft 28 is threadedly engaged. The other end of the support shaft 28 is externally threaded as at 30 for a purpose which will be hereinafter more fully set forth.

A limit member generally referred to by the reference numeral 32 is generally cylindrical in configuration and includes an end wall 34 which is provided with a threaded bore 36 and is threadedly engaged on the threaded end portion 26. The limit member 32 includes a generally radially outwardly projecting arm or pointer 38 for a purpose which is to be set forth hereinafter.

The open end of the cylindrical portion 40 of the limit member 32 defines an annular abutment 42 for engagement with a first pressure disk 44 which is loosely and slidably disposed on the shaft 28 and has an inside diameter substantially equal to the inside diameter of the cylindrical portion 40. A second pressure disk 46 is provided and is secured to a sleeve 48 which projects outwardly from opposite sides of the inner periphery of the pressure disk 46. The sleeve 48 is rotatably and slidably received through the pressure disk 44 and within the cylindrical portion 40 of the limit member 32.

An actuating sleeve generally referred to by the reference numeral 50 is provided and is rotatably and slidably disposed over the shaft 28 and the end of the sleeve 48 remote from the limit member 32. The actuator sleeve 50 has a generally helical slot 52 formed therein through which a follower pin 54 carried by and extending generally radially outwardly of the shaft 28 is slidable.

An adjusting knob 56, including a cylindrical portion 58 which is similar to the cylindrical portion 40, is threadedly engaged on the end portion 30 of the shaft 28. The open end 60 of the cylindrical portion 58 defines an annular abutment corresponding to the annular abutment 42 and has a longitudinal blind bore 62 formed therein in which the angulated terminal end portion 64 of a compression and torsional spring 66 is seated. The other end of the torsional and compression spring 66 is also angulated as at 68 and seated in a blind bore 70 formed in the end face 72 of the actuating sleeve 50. The actuating sleeve 50 has a generally circumferential and outwardly opening groove 74 formed therein in which the generally circular inner end portion 76 of the tension arm 78 is seated, the end portion 76 being clampingly engaged with the sleeve 50 whereby its rotated position on the sleeve 50 may be readily adjusted and frictionally retained.

Figure 3:
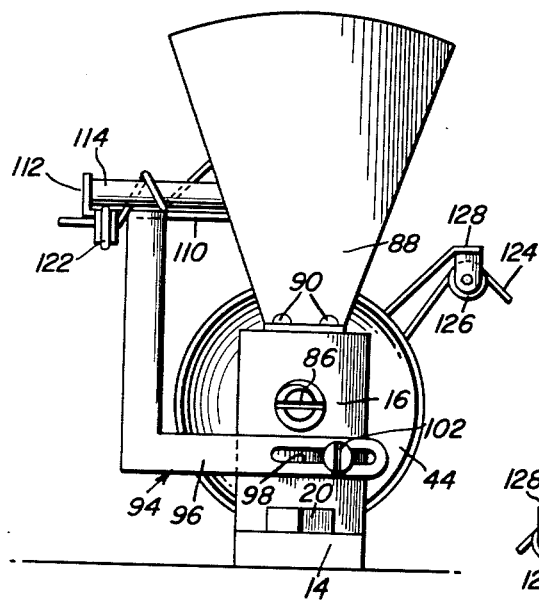
FIGURE 3 is an end elevational view of the device as seen from the left side of FIGURE 2.
Figure 4:
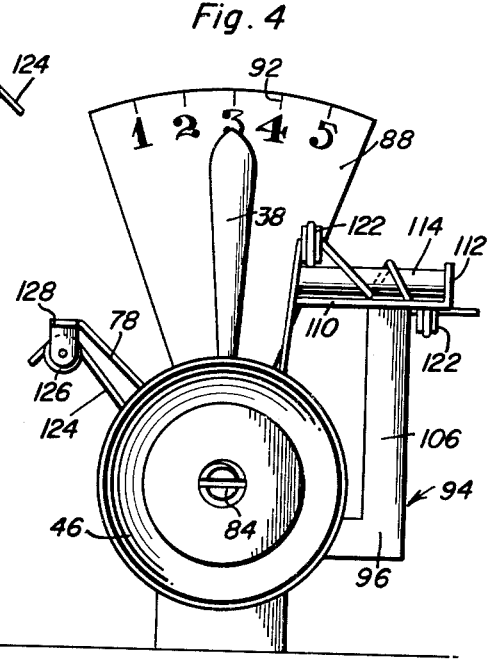
FIGURE 4 is an end elevational view of the device as seen from the right side of FIGURE 2.
Figure 6:
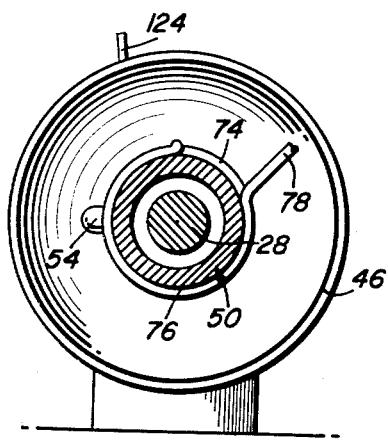
FIGURE 6 is an enlarged transverse vertical sectional view taken substantially upon the plane indicated by the section line 6—6 of FIGURE 2.
Figure 7:
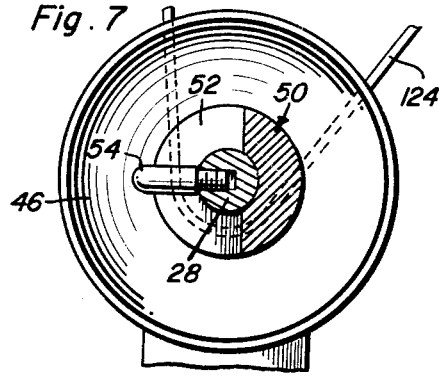
FIGURE 7 is a transverse vertical sectional view taken substantially upon the plane indicated by the section line 7—7 of FIGURE 5.

As can best be seen from FIGURES 3 and 4 of the drawings, the opposite ends of the support shaft 28 are provided with kerfs 84 and 86. In addition, it may be seen from FIGURES 3 and 4 that a gage plate 88 is secured to the upper end of the leg 16 by means of suitable fasteners 90 and that the gage plate includes indicia 92 with which the free end of the pointer 38 is registrable. Still further, a guide arm generally referred to by the reference numeral 94 is provided and includes a first leg 96 having a longitudinal slot 98 formed therein. The leg 96 is slidably received in a groove 100 formed in the leg 16 and a headed pin 102 which projects outwardly of the groove 100 has its shank portion (not shown) slidably received in the slot 98. It is to be understood that the headed pin 102 is provided with an externally threaded shank portion (not shown) which is threadedly received in an appropriate blind bore opening outwardly of the groove 100. In this manner, the leg 96 may be longitudinally adjusted in the groove 100. The guide arm 94, as can best be seen from FIGURE 8 of the drawings, includes a second leg 106 which terminates at its free end in an angulated portion 108. A generally U-shaped mount 110 including a pair of upstanding tabs 112 is carried by the free end of the angulated portion 108 and a roller 114 is rotatably journalled between the tabs 112. Still further, a wire guide 116 is secured to the bight portion 118 of the mount 110 and includes a pair of angulated end portions 120 which each terminates in a coiled eye portion 122 for slidably receiving the length of yarn operatively associated with the thread tensioning device 10.

In operation, the thread tensioning device 10 may be secured to the mounting surface 18 as previously hereinbefore set forth and the limit member 32 may have its pointer adjusted so as to register with a given one of the indicia 92. The adjusting of the limit member longitudinally of the support shaft 28 will of course establish a predetermined limit position of movement of the first pressure disk 44 relative to the second leg 16. Then, the adjusting knob 56 may be rotated as desired on the externally threaded end portion 30 so as to vary the torsional forces effected by the spring 66. Rotating the adjusting knob 56 on the shaft 28 will of course also change the axial thrust effected by the spring 66. However, if it is desired, either one of the angulated end portions 64 and 68 may be withdrawn from the corresponding anchoring bore in order that the adjusting knob 56 may be rotated one complete turn so as to vary the axial thrust effected by the spring 66 without varying the torsional forces effected thereby on the actuating sleeve 50. Still further, the support shaft 28 may be rotated relative to the second leg 16 in order to vary the positioning of the follower pin 54 in the helical slot 52 when the tensioning device 10 is in its rest position.

It may therefore be seen that numerous methods may be utilized to adjust both the axial and torsional forces applied to the actuating sleeve 50 for the purpose of urging the second pressure disk 46 toward the first pressure disk 44.

When the device 10 is in operation, the associated thread or yarn 124 is passed through one of the eyes 122 and then passed about the roller 114 and through the other eye 122. Thereafter, the thread 124 is looped under the sleeve 48 between the pressure disks 44 and 46 and passed upwardly over the roller 126 carried by the bifurcated mount 128 on the free end of the tension arm 78, see FIGURES 3 and 9.

The tension device 10 will then be capable of providing the desired amount of drag on the thread or yarn 124 as it passes from the roller 126 to the working mechanisms of the knitting machine with which the device 10 is operatively associated.

With attention now directed more specifically to FIGURES 10-12 of the drawings there will be seen a modified form of thread tensioning device generally referred to by the reference numeral 10'. The thread tensioning device 10' includes many of the structural components of the thread tensioning device 10 and accordingly, the component parts of the tensioning device 10' have been given prime reference numerals corresponding to the reference numerals of the corresponding components of the tensioning device 10.

From a comparison of FIGURES 5 and 10 of the drawings, it may be seen that the shaft 28' and the components mounted thereon have been reversed end-to-end relative to the corresponding positions of these components of the device 10. However, the adjusting knob 56' has been retained on the free end of the shaft 28' and functions as the limit member 32 functions on the device 10. Instead of the end of the spring 66' remote from the sleeve 50' being seated in the bore 62' formed in the adjusting nut 56', because of the relocation of the adjusting nut 56', the angulated end portion 64' is seated in a bore 65 formed in an abutment washer 67 that is disposed about the shaft 28' and secured in position relative to the second leg 16' by means of a suitable fastener 69.

The axial thrust effected by the spring 66' may be adjusted independently of the torsional forces effected thereby when the shaft 28' is shifted axially relative to the second leg 16'. Further, the torsional forces effected by the spring 66' may be adjusted merely by loosening the fastener 69 and rotating the disk or washer 67 to the desired position and again tightening the fastener 69. The adjusting nut 56' then takes over the function of the limit member 32 and it may therefore be seen that the thread tensioning device 10' may be adjusted in substantially the same manner as the device 10 may be adjusted.

Figure 13:
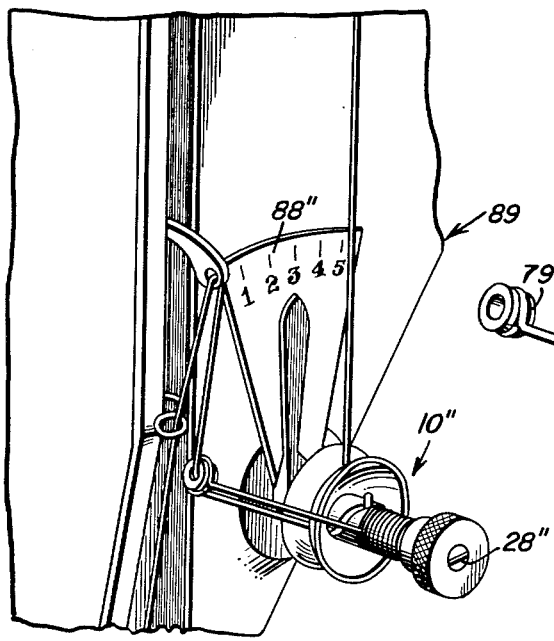
FIGURE 13 is a perspective view showing a still further form of the thread tensioning device of the instant invention mounted upon a sewing machine.
Figure 14:
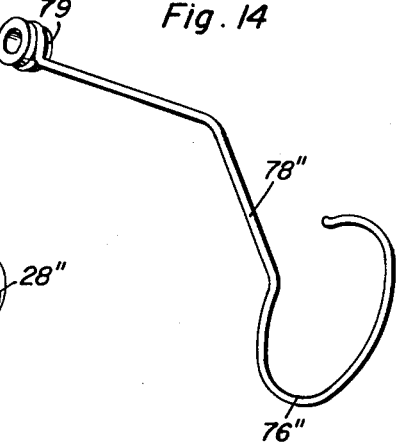
FIGURE 14 is a perspective view of the tension arm of the embodiment illustrated in FIGURE 13.
Figure 8:
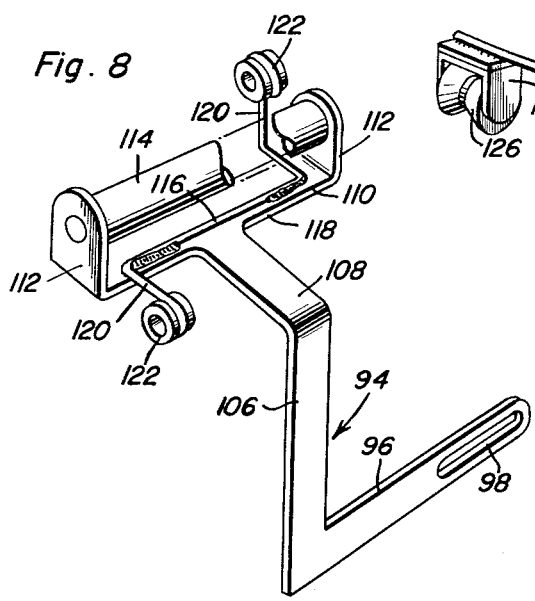
FIGURE 8 is a perspective view of the guide arm of the thread tensioning device which is adapted to guide the thread being tensioned into the tensioning device.
Figure 9:
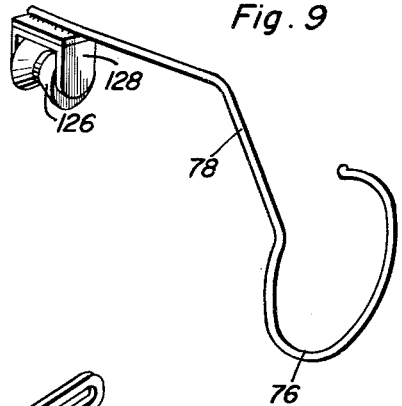
FIGURE 9 is a perspective view of the tension arm of the tensioning device.

With attention now directed to FIGURES 13 and 14 of the drawings there will be seen a third form of tension device generally referred to by the reference numeral 10". The tensioning device 10" is substantially the same in construction as the tensioning device 10 with the exception being that the gage plate 88" is secured to the sewing machine generally referred to by the reference numeral 89 and the shaft 28" is also supported from the sewing machine 89. Still further, the guide arm 94 provided on the device 10 is not needed on the device 10" and is therefore omitted.

Still further, the tension arm 78" of the tensioning device 10" is substantially the same in construction on its inner end as the torsioning arm 78. However, instead of the bifurcated mount 128 and the roller 126 supported thereby, the free end of the tension arm 78" is provided with a coiled eye portion 79.

The items 78, 56, 32, 66, 28, 67, 74 and 54 together with the slot 52 formed in the item 74 all comprise parts of displacement means for adjusting the spacing between the disks 44 and 46 as determined by the tension of the associated yarn and it is also to be noted that the corresponding component parts of the two other forms of the invention disclosed also constitute displacement means for varying the spacing between the associated disks as determined by the tension of the corresponding yarn section.

With attention now invited to FIGURE 5 of the drawings it may be seen that the axial thrust developed by the spring 66 may be independently adjusted by withdrawing the end portion 64 from the bore 62 and rotating knob 56 one revolution and then re-inserting the end portion 64. Further, it would then be possible to adjust the axial thrust effected by the spring 66 as well as the torsional thrust afforded by thereafter turning the knob 56 one-half revolution in the opposite direction resulting in the axial thrust of the spring 66 being increased by one-half revolution of the knob 56 and the torsional thrust of the spring 66 being increased by one-half revolution of the knob 56. Still further, the torsional thrust alone may be adjusted by turning the knob 56 one complete revolution, removing the end portion 64, turning the knob back in the opposite direction one revolution and then re-inserting the end portion 64.

It may of course be appreciated that the tensioning device 10" may be adjusted in the same manner in which the device 10 may be adjusted and therefore that each of the devices 10, 10' and 10" may be adjusted in several different ways in order to selectively vary the effective axial and torsional forces applied to the corresponding actuating sleeves by the compression and torsional springs thereof.

The thread tensioning device is not only a manually adjustable tensioning device, but one that regulates the tension upon the yarn passing therethrough and maintains that tension at a point to assure even and uniform pull upon the yarn as it goes into the associated machine. It is to be understood that the manual adjustments obtained through the adjusting of items 78, 56, 32, 66, 28, and 67 are preliminary to the operation of the device in order to set the latter to the desired pull for the particular machine with which the device is operatively associated. Further, once the desired tension is set by the foregoing adjustments, it is automatically maintained constant by the force exerted by the yarn 124 on the tension arm 78. In this manner, even stitching is effected in the product being manufactured regardless of the change in diameter or texture of the yarn being used. The tensioning device of the instant invention is superior to the tensioning device disclosed in my copending application U.S. Ser. No. 193,814 in that it also includes the installation of the sleeve 48 between the pressure disks 44 and 46 which assures proper alignment of the disks and enables rotation of the disks relative to each other during operation of the tensioning device.

The rotation of the pressure disks relative to each other and to the shaft 28 will cause any lint to be shed through tension of the yarn thereby preventing the lint to collect in the tensioning device causing slugs which might in turn cause the thread or yarn to be broken. Further, inasmuch as both torsion and axial forces are governed by one spring more accuracy is afforded and the tensioning device is more readily adjusted for the desired tension of the yarn.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable thread tensioning device comprising a support shaft adapted to be supported at one end from a knitting or sewing machine,, a pair of side-by-side pressure disks slidably mounted on said shaft, limit means stationarily positioned relative to said shaft and limiting axial slding movement of one of said disks in one direction along said shaft, a sleeve slidable and rotatable on said shaft and disposed on the side of the other disk remote from said one disk, displacement means yieldably urging said sleeve in one direction along said shaft toward said other disk and including adjustable axial thrust means for applying an axial thrust on said sleeve in said one direction, a tension arm carried by said sleeve and extending transversely of and outwardly from one side of said sleeve, the free end portion of said arm including guide means adapted to slidingly guide a portion of a length of thread passing between said disks, said sleeve and shaft including coacting cam means for shifting said sleeve away from said other disk in response to rotation of said sleeve relative to said shaft, said displacement means also including torsional thrust means normally resiliently urging rotation of said sleeve in a direction effecting axial shifting of said sleeve toward a limit position of movement in said one direction and beng adjustable so as to vary the effective torque developed thereby.

2. The combination of claim 1 wherein said limit means is adjustable longitudinally of said shaft.

3. The combination of claim 1 wherein said limit means is axially shiftable relative to said shaft.

4. The combination of claim 1 wherein said displacement means includes means for adjusting the axial thrust effected thereby on said sleeve independently of adjustment of the torque effected thereby on said sleeve.

5. The combination of claim 1 wherein said displacement means includes means for increasing the axial thrust effected thereby on said sleeve while simultaneously decreasing the torque effected thereby on said sleeve.

6. The combination of claim 1 wherein said displacement means includes means for adjusting the torque effected thereby on said sleeve independently of adjustment of the axial thrust effected thereby on said sleeve.

7. The combination of claim 1 wherein said displacement means includes means for decreasing the axial thrust effected thereby on said sleeve while simultaneously decreasing the torque effected thereby on said sleeve.

8. The combination of claim 1 wherein said displacement means includes means for increasing the axial thrust effected thereby on said sleeve while simultaneously increasing the torque effected thereby on said sleeve.

9. The combination of claim 1 wherein said displacement means includes means for decreasing the axial thrust effected thereby on said sleeve while simultaneously increasing the torque effected thereby on said sleeve.

References Cited by the Examiner

UNITED STATES PATENTS

| 267,563 | 11/82 | Mitchel | 242—150 |
| 472,097 | 4/92 | Wilcox et al. | 242—150 |
| 946,164 | 1/10 | Steere. | |
| 1,596,095 | 8/26 | Gehman | 242—154 |
| 1,863,951 | 6/32 | Swanson | 242—150 |
| 1,997,709 | 4/35 | Williams | 242—154 |
| 2,554,493 | 5/51 | Heizer | 242—150 |

FOREIGN PATENTS

| 915,401 | 7/46 | France. |

MERVIN STEIN, *Primary Examiner.*

RUSSELL C. MADER, *Examiner.*